July 17, 1928.  1,677,391
J. KELSO
FLOWER POT BASE FORMER
Filed Sept. 17, 1927
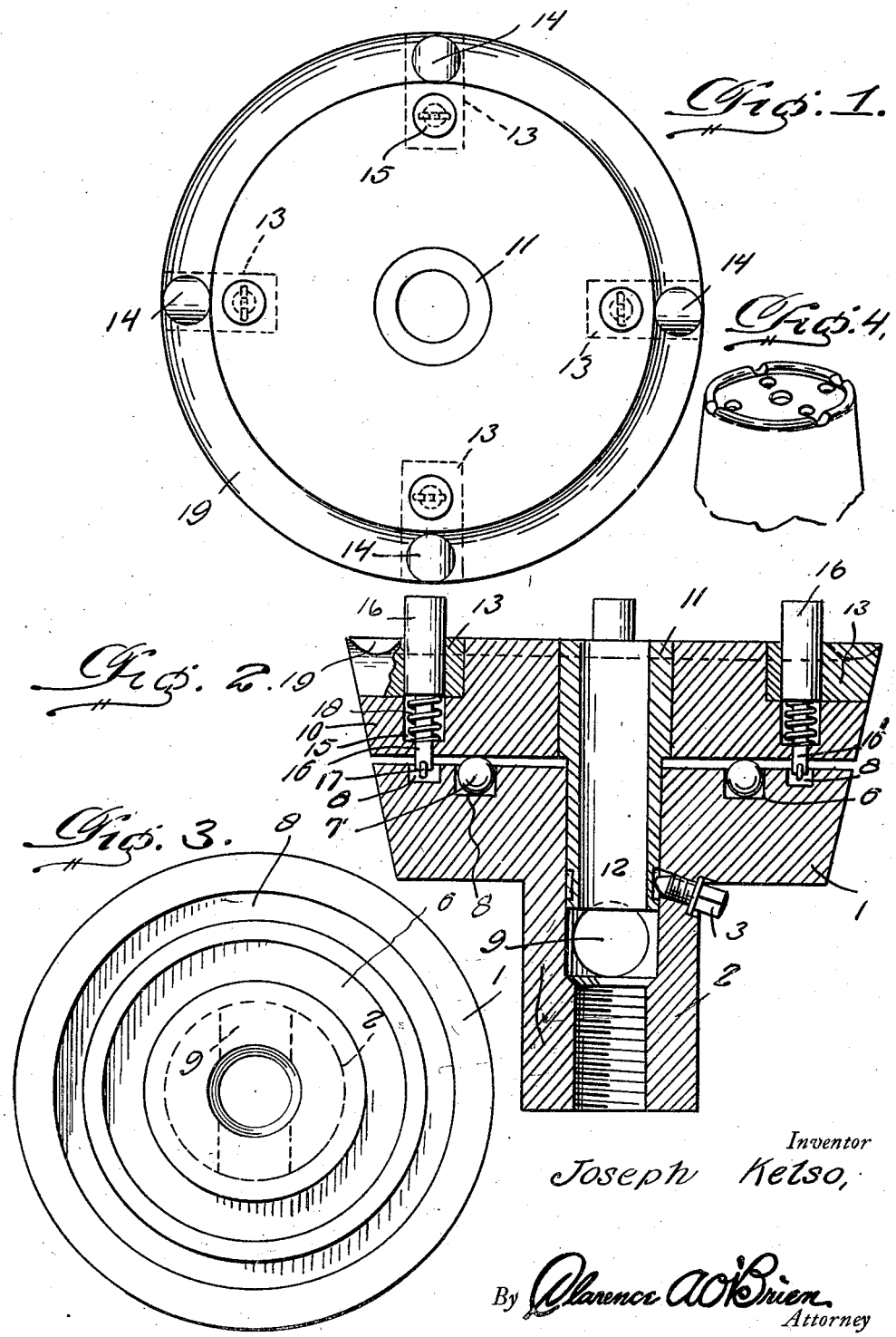
Inventor
Joseph Kelso,
By Clarence A. O'Brien
Attorney Patented July 17, 1928.

1,677,391

UNITED STATES PATENT OFFICE.

JOSEPH KELSO, OF BELLEVUE, IOWA, ASSIGNOR TO JOSEPH R. FRAILEY, OF FORT MADISON, IOWA.

FLOWERPOT-BASE FORMER.

Application filed September 17, 1927. Serial No. 220,213.

My invention relates to flower pot base formers, and the same has a more particular reference to a device for forming drain openings in the base of a flower pot, the same being more particularly adapted for forming the novel flower pot base as represented in my co-pending application on improved flower pot, Serial Number 220,214 filed September 17, 1927.

Heretofore, it has been quite impractical to construct a flower pot with more than one drain opening in the base thereof, for the reason that the manufacture heretofore has been by a process wherein the entire base of the former remained stationary and the pot revolved in respect to this stationary base former.

In this process, the opening in the base of the pot, has been formed by a rod which perforates thru the base of the pot, the pot revolving about this rod in the course of the manufacture of same.

Obviously, it would be impossible to make my opening by this operation. This invention make it possible to make more than one opening in the base of the pot, for the reason that the upper section of the former revolves with the core independently, and separate from the lower part of the same.

In one operation of my novel former, the base of the flower pot is completely shaped.

No particular type of flower pot mold is shown in the drawing, associated with my improved base former, due to the fact that the same may be employed with any type of mold with which it may be operative.

An object of my invention is to provide a base former employed in the manufacture of flower pots, for shaping and forming the base portion thereof. A single operation of said former is all that is required to form the complete base portion of a flower pot.

Another object of my invention resides in the fact that a plurality of openings may be formed in the base portion of the flower pot, without in any way interfering with the proper forming and shaping of the flower pot body.

Another object resides in the spring supported opening formers, associated with my base former, for forming a clean cut drain opening in the base of the pot.

Still a further object is noted in the novel provision I have made for the disposition tailings from the interior of the flower pot.

Other objects and advantages will become apparent as my invention is better understood from the specification and claims to follow.

In the drawing:—

Figure 1 represents a top plan view of my flower pot base former.

Fig. 2 is a partial cross sectional view, the two parts of my base former, swivelled together, and the spring supported drain opening forming pin associated with the upper part.

Fig. 3 is a top plan view of the lower part of my base former, with the top part removed, showing the guideway and ball race, and Fig. 4 represents a type of a flower pot base adapted to be manufactured by my improved base former.

For a more detail explanation of my invention, I now refer to the drawings in which like numerals designate like parts. The stationary base plate 1 formed with an internally threaded depending shank portion 2, is adapted to be supported upon a reciprocatory rod threaded into said internally threaded shank. At the top portion of said shank portion is formed an internally threaded opening communicating with the interior of the shank and into which is adapted to be threaded a set screw 3, the pointed extremity of said set screw adapted to project a slight distance into the interior of said shank.

An annular concentric channelway 6 is formed in the top surface of said base plate 1 and is adapted to have located therein a plurality of ball members 7. Located outwardly, but parallel with the channel 6 is formed an annular guideway 8 in the top face of the base plate.

Openings 9 at the top portion of the shank 2 are formed therethrough. A rotatable plate 10 is formed centrally therethrough with an opening in which is secured a bushing 11. The lower portion of this bushing is reduced and adapted to depend in a snug rotatable rotation within the opening of the base plate 1. Adjacent the lower end of this bushing, is formed an annular groove-way 12, into which the extremity of said set screw 3 is adapted to project.

The rotatable plate 10 is thusly swivelled to the lower stationary plate 1. The balls 7 affording a ball bearing surface at the under side of the rotatable plates. Openings extending inwardly from the periphery of the rotatable disk are formed at spaced intervals around the top portion thereof, said openings adapted to have disposed therein insert members 13, preferably of a metal.

The top surface of the said insert is adapted in flush relation, with the top surface of the rotatable plate, and however, the portions adjacent their outer ends are formed in an arcuate shaped formation 14 in transverse cross section.

Extending downwardly from the opening formed to accommodate the insert 13, is formed a plurality of openings 15. The metal inserts 13 are further formed with openings in which pin members 16 are slidably disposed. At their lower ends, these pin members 16 are provided with depending rod extensions 16' which are adapted to pass through the lower part of the rotatable plate for projected disposition within the guideway grooves 8 of the stationary plate 1.

The lower extremities of these rod extensions are provided with a transverse key members 17. These transverse keys are provided to engage the underside of the rotatable plate to prevent the coiled spring 18 disposed around the rod extensions, from projecting the pin 15 from the openings in the insert 13.

Adjacent the periphery of the rotatable plate, at the top side thereof, is formed an annular arcuate groove 19. The formations on the inserts are disposed in the path of the annular groove 19, for the purpose of forming the drain ditches formed in the annular ribs at the bottom of the proposed flower pot as in Fig. 4.

My improved base former is intended in substitution of the usual stationary base former employed in the conventional flower pot mold. Therefore the function is of my base former is relatively the same as the stationary base formers, excepting that the upper portion of my base former is rotatable and by which the mold structure and core are adapted to be superimposed.

The internally threaded shank portion 2 of the stationary plate portion of my base former is adapted to be threaded onto the threaded end of a reciprocatory rod not shown in the drawings. The reciprocatory movement of this rod is adapted to lift my improved base former into engagement with the rotatable core and mold structure containing the unformed bottom of a flower pot blank therein.

As the rotatable plate of my base former engages the bottom side of said flower pot blank, the opening forming said members 16 will curve through the bottom of the blank forming a plurality of drain openings heretofore very difficult to form, due to the fact that the stationary base former was not adapted to rotate with the rotatable core.

However, in this operation, the rotatable plate of my base former will become affixed to the rotatable core and mold structure, due to the penetration of the said members 16 through the blank and into the core. In this position in relation to the core and mold structure, the rotatable plate 10 will cause the bottom of the flower pot blank to fill in the annular groove 19.

In this feature of the operation the annular rim formed on the bottom of the flower pot blank, due to the filling in of the annular groove 19 on the rotatable plate, will be formed with a plurality of drain nitches, due to the presence of the obstructive formation 14 in the groove 19.

When the rotatable plate has thusly formed the annular rib, and the pin members have formed the drain openings, and further still, a suitable member on the core has pierced the flower pot centrally through the bottom thereof, and internally extending within the bushing 11, the rotatable core is then at the point where it may be rotated to form the body of the flower pot.

In the operation of forming the flower pot body, which is conventional, and forms no part of this invention, the rotatable plate of my base former due to the fact that it has become affixed to the core and mold structure through the flower pot blank, is adapted to rotate on the stationary plate 1. Due to the manner in which the rotatable plate is swivelled to the stationary plate, and the fact that the stationary plate is provided with a ball raceway, upon which the rotatable plate rests, the latter will rotate with considerable ease and regularity in planer movements, thus making it possible to construct a more perfect flower pot.

As shown in Fig. 2 of the drawing, the pin members 15 and spring projected for the purpose that in passing through the bottom of the flower pot blank, it is considerably more defective to allow these pin members to pierce through the blank bottom due to their own independent pressure rather than the engagement of a plurality of rigid pins forced through the blanks thru the motion of the reciprocatory rod, not shown.

Having thus described my invention, what I claim as new is:—

1. A base former for forming the base of a flower pot blank with a plurality of drain openings therethrough and adapted for association with the mold and core structure for forming the body thereof, a stationary base, a rotatable plate adapted to rotate upon said stationary base, and projecting construction associated with the top of said rotatable plate for forming openings in the base of a flower pot blank.

2. A base former for forming the base of flower pot blanks with a plurality of drain openings therethrough and adapted for association with the mold and core structure for forming the body thereof, a stationary base, said stationary base being provided with means for reciprocating the same, a rotatable plate rotatably mounted upon said stationary base, said rotatable plate formed with an annular groove in the top thereof, and projections associated with the top of said rotatable plate adapted for penetrating said blank and forming openings in the bottom thereof.

3. A base former for forming the base of flower pot blanks with a plurality of drain openings therethrough and adapted for association with the mold and core structure for forming the body thereof, a stationary base, means associated with said base adapted to reciprocate the same, a plate rotatably mounted upon said stationary base, said rotatable plate formed with an annular groove in the top surface thereof, a structure associated with said rotatable plate adapted to obstruct said groove at spaced intervals therein, and projecting constructions associated with the top of said rotatable plate and adapted to penetrate the bottom of the flower pot blank to form openings therethrough.

4. A base former for forming the base of flower pot blanks with a plurality of drain openings therethrough and adapted for association with the mold and core structure for forming the body thereof, a stationary base, means associated with said base adapted to reciprocate the same, a plate rotatably mounted upon said stationary base, said rotatable plate formed with an annular groove in the top surface thereof, a structure associated with said rotatable plate adapted to obstruct said groove at spaced intervals therein, and projecting constructions associated with the top of said rotatable plate and adapted to penetrate the bottom of the flower pot blank to form openings therethrough, said projecting construction comprising a pin adapted for slidable projection through the top of said plate, and spring means associated with said pin for maintaining the same in projected position.

5. A base former for forming the base of flower pot blanks with a plurality of drain openings therethrough and adapted for association with the mold and core structure for forming the body thereof, the stationary base formed with an opening therethrough, a rotatable plate rotatably mounted upon said stationary base plate, said rotatable plate being formed with an opening therethrough, a bushing secured within the opening of the rotatable plate, and adapted to depend downwardly from the under side thereof, said projecting part of the bushing adapted for swivelled engagement within the opening to the base plate, and structure associated with the top of the rotatable plate for forming the bottom of a flower pot blank.

6. A base former for forming the base of flower pot blanks with a plurality of drain openings therethrough and adapted for association with the mold and core structure for forming the body thereof, a stationary base having formed therethrough an opening, said base provided with a depending reduced hollow shank portion, means associated with said hollow shank portion for reciprocating said base plate, a rotatable plate rotatably mounted upon said base plate, and construction associated with the top of said rotatable plate for forming the bottom of a flower pot blank.

In testimony whereof I affix my signature.

JOSEPH KELSO.